Figure 1:
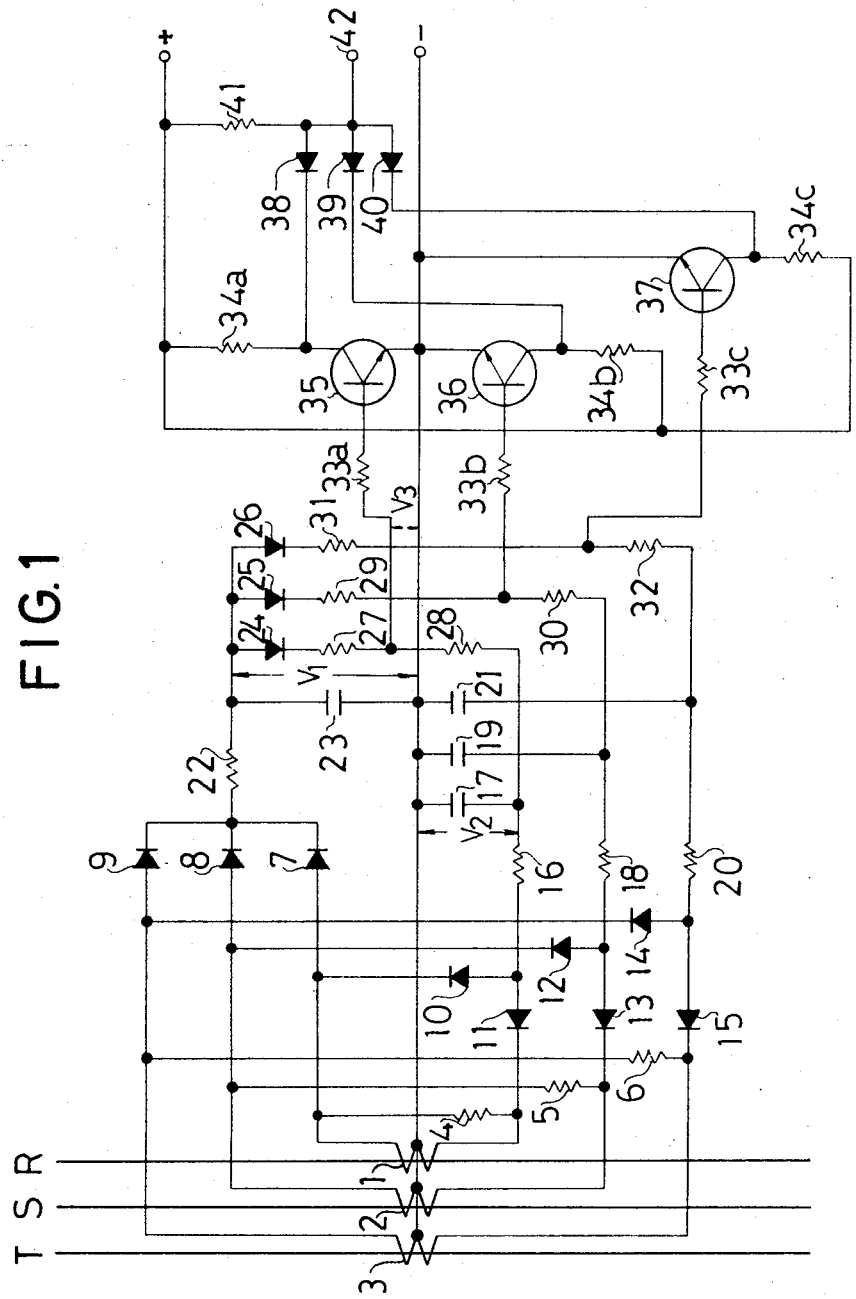

United States Patent [19]

Huruse

[11] 3,745,375
[45] July 10, 1973

[54] PHASE UNBALANCE OR OPEN-PHASE DETECTING APPARATUS

[75] Inventor: Mituhiro Huruse, Shinagawa-ku, Tokyo, Japan

[73] Assignee: Kabushiki Kaisha Meidensha, Tokyo, Japan

[22] Filed: Dec. 1, 1971

[21] Appl. No.: 203,704

[30] Foreign Application Priority Data
Dec. 9, 1970 Japan.............................. 45/109866

[52] U.S. Cl................ 307/231, 307/321, 317/27 R, 321/11, 307/202
[51] Int. Cl. ........................................... H03k 5/20
[58] Field of Search.................... 307/232, 231, 202; 328/133, 109, 110; 317/27 R; 321/11, 12

[56] References Cited
UNITED STATES PATENTS

| | | | |
|---|---|---|---|
| 3,323,033 | 5/1967 | Lorentzen et al.................. | 321/11 X |
| 2,935,676 | 5/1960 | Keltz..................... | 321/11 |
| 3,573,603 | 4/1971 | Andersson............................ | 321/12 |
| 3,103,633 | 9/1963 | Hartog............................ | 307/232 X |
| 3,134,076 | 5/1964 | Haner et al.......................... | 328/133 |
| 3,184,608 | 5/1965 | Goldfarb............................. | 307/232 |
| 3,265,904 | 8/1966 | Spencer............................... | 307/232 |
| 3,629,713 | 12/1971 | Szpilka............................ | 328/110 X |

*Primary Examiner*—John S. Heyman
*Attorney*—Hans Berman et al.

[57] ABSTRACT

A plurality of current transformers have primary windings connected to a phase signal circuit and secondary winding each having a plurality of terminals, respectively. One terminal of the secondary windings is connected to a positive direct signal generating means in common to said current transformers so that a constant voltage signal is held thereat when there is at least one of the phase signals in a normal condition. The other terminals of the secondary windings are connected to a plurality of negative direct signal generating means which are the same in number as said current transformers. Difference signals are derived from the outputs of the positive direct signal generating means and the negative direct signals generating means. The variation of the difference signals indicate the phase unbalanced or open-phase signal.

6 Claims, 3 Drawing Figures

PHASE UNBALANCE OR OPEN-PHASE DETECTING APPARATUS

This invention relates to a phase unbalance or open-phase detecting apparatus, more particularly to an improved phase unbalance or open-phase detecting apparatus for polyphase circuits for detecting that the current in at least one phase of a multi-phase circuit has completely vanished or has become lower in value than those in other phases.

In the prior art, there have been proposed and used various kinds of the phase unbalance or open-phase detecting apparatus. However, erronious operations caused by distorted waves which are developed by various causes such as a transformer surge current, direct components of motor starting current and unloaded motor operation, and the like have not been entirely removed from these detection apparatus.

When an induction motor, the transformer or the like is used as a load, the detection of phase unbalanced or open-phase signals is generally performed by phase currents and not by phase voltages. Thus, special consideration should be paid to any countermotive for the phase currents.

Further, when any one of the phase signals is unbalanced or open-phased, the following phenomena occur; (a) The wave of one phase signal is different from that of any one of the other phase signals, (b) The ripple component contained in one phase signal is different from that contained in any one of the other signals, (c) The phase of one phase signal is different from that of any one of the other phase signals. The above described phenomena (a) through (c) are used in most of the prior art detection apparatus. However, it is noted that the more distorted waves and direct signal components are, the more difficult the difference signals between a normal condition and the above described phenomena (a) through (c) are quantitively determined. That is to say, changes in the waves or phases of the phase signals in a normal condition are so complicated that they may not be distinguished from those of the waves or phases in which any one of the phase signals is phase unbalanced or open-phased.

Therefore, this prior art detection apparatus is not free from erronious operation so long as attention is not paid to any countermotive for the distorted waves and direct signal components. For example, if only a sine wave is used in the phase unbalance or open-phase detecting apparatus by detecting a null in a portion of the output in which three phase signals are open-phased into a single phase signal or by measuring the difference of ripple components between the three phase signals and the single phase signal, that is, the open-phase signal. Especially, erronious operation may be introduced into this detection apparatus by the transformer surge current in which a lot of second harmonic and fourth and fifth harmonic components are contained.

Further, in a prior art detection apparatus in which the phase unbalancing or open-phase of the phase signal is detected by voltage signals, there is no problem with distorted waves and direct signal components. However, this detection apparatus has the defect that the open-phase or phase unbalancing of the phase signal at the voltage supply side from a relay setting point can be detected, but the phase unbalancing or open-phase of the phase signal at the load side cannot be detected.

From the above description, it will be understood that the detection of the phase unbalancing or open-phase of the phase signal is preferably made by using direct signal components of the phase signals instead of using changes in the waves, the phases, the ripple components or the like thereof to remove the above described disadvantages.

Therefore, it is a general object of this invention to provide an improved phase unbalance or open-phase detecting apparatus which eliminates the above described disadvantages.

It is another object of this invention to provide an improved phase unbalance or open-phase detecting apparatus which is simple in construction.

It is a further object of this invention to provide an improved apparatus in which the phase unbalancing or open-phase of any phase signal can be detected without using changes in the waves, the phases, the ripple components or the like of the phase signals.

It is a still further object of this invention to to provide an improved apparatus in which phase unbalancing or open-phase of any phase signal can be detected by converting the phase current signals from a phase signal circuit into direct voltage signals.

These and other objects can be achieved by an improved apparatus in which the phase unbalancing or open-phase of the phase signal is detected comprising; a plurality of current transformers provided with primary windings connected to a phase signal circuit and secondary windings having at least two terminals, a positive direct signal generating means connected to one terminals of the secondary windings of said current transformers in common to said phase signals for generating a direct signal, a plurality of negative direct signal generating means, each of which is connected to the other terminal of the secondary winding of a corresponding current transformer, for generating negative direct signals, difference signal generating means connected to the positive direct signal generating means and said negative direct signal generating means for generating difference signals therebetween, and a switching means operated by any one of said difference signals so that the phase unbalancing or open-phase of the phase signal may be detected.

Figure 2:
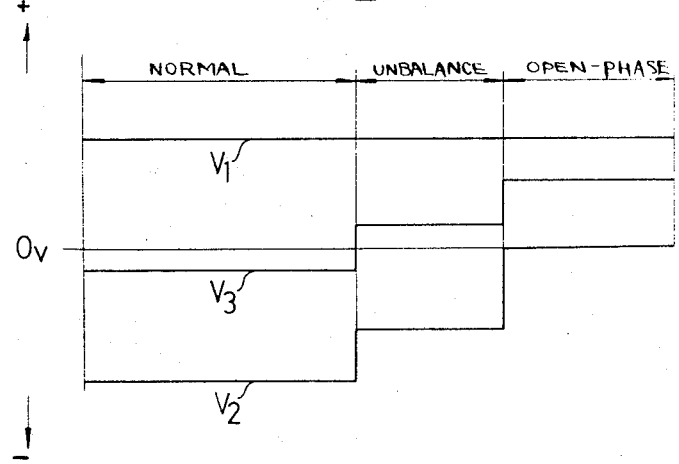
Figure 3:
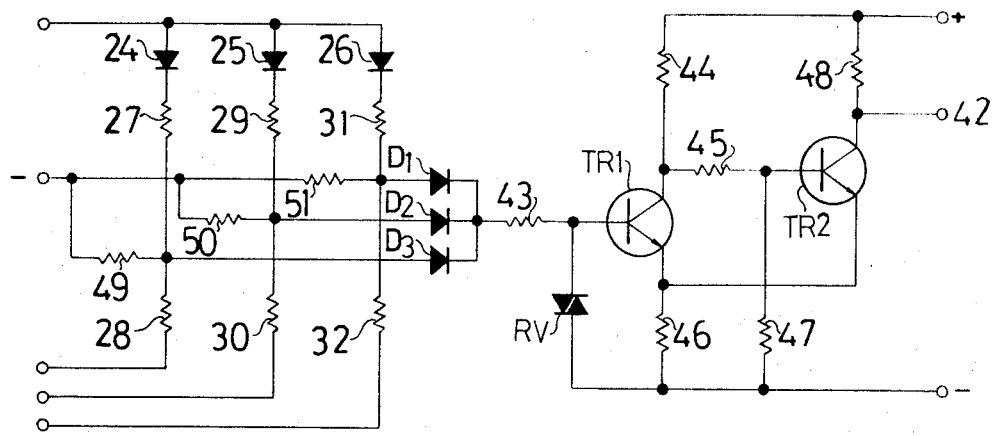

Further advantages of this invention will be more apparent from a review of the following description taken in connection with the attached drawings, in which FIG. 1 is a circuit diagram showing one embodiment of the phase unbalance or open-phase detecting apparatus according to this invention, FIG. 2 is a graph of the signals detectable by the detection apparatus shown in FIG. 1, and FIG. 3 is a circuit diagram showing another embodiment of the phase unbalance or open-phase detecting apparatus according to this invention.

R, S and T each represent one phase of a three-phase circuit (not shown). The vertical solid lines shown corresponding to R, S and T are primary windings (each of which usually comprises a single conducting wire) of respective current transformers, the ends of said lines (lower ends as viewed in the drawing) which are opposite the ends connected to the three-phase circuit are connected to an appropriate load. The three current transformers are provided with secondary windings 1, 2 and 3, respectively serving to derive secondary currents proportional to the currents of the rspective phases R, S and T flowing through the corresponding primary windings. Connected to the opposite ends of the secondary windings 1, 2 and 3 are resistor loads 4, 5 and 6, respectively deriving the secondary outputs of the current transformers as output voltages proportional to the primary currents. Center terminals of the secondary windings 1 through 3 are connected to a negative voltage supply (−) in common. One terminal of the secondary windings 1 through 3 are connected to the anodes of diodes 7, 8 and 9 forming half wave rectifiers. The cathodes of the diodes 7, 8 and 9 are connected to one end of a resistor 22, the other end of which is connected to a capacitor 23, the resistor 22 and the capacitor 23 forming a smothing circuit for the positive rectified half waves.

On the other hand, the other terminals of the secondary windings are connected to diodes 11, 13 and 15, respectively. Resistors 4, 5 and 6 are connected across both terminals of the current transformers 1 through 3, respectively. Diodes 10, 12 and 14 are also connected in parallel with resistors 4, 5 and 6 through the diodes 11, 13 and 15. The diode 10 forms a negative full wave rectifier for the R phase signal with the diode 11. The diode 12 forms a negative full wave rectifier for the S phase signal with the diode 13. The diode 14 forms a negative full wave rectifier for the T phase signal with the diode 15.

The junction of the diodes 10 and 11 is connected to one end of a resistor 16, to the other end of which a capacitor 17 is connected. The other end of the capacitor 17 is connected to the negative voltage supply, the resistor 16 and the capacitor 17 forming a smoothing circuit for the negative rectified full wave of the R phase signal. The output of the common positive signal smoothing circuit is connected to the output of the negative signal smoothing circuit for the R phase signal through a diode 24 and resistors 27 and 28.

The junction of the diodes 12 and 13 is connected to one end of a resistor 18, the other end of which is connected to a capacitor 19 also connected to the negative voltage supply, the resistor 18 and the capacitor 19 forming a smoothing circuit for the negative rectified full wave of the S phase signal.

The output of the common positive signal smoothing circuit is connected to the output of the negative signal smoothing circuit for the S phase signal through a diode 25 and resistors 29 and 30. The junction of the diodes 14 and 15 is connected to one end of a resistor 20, the other end of which is connected to a capacitor 21 also connected to a negative voltage supply, the resistor 20 and the capacitor 21 forming a smoothing circuit for the negative rectified full wave of the T phase signal. The output of the common positive signal smoothing circuit is connected to the output of the negative signal smoothing circuit for the T phase signal through a diode 26 and resistors 31 and 32.

The junction of the resistors 27 and 28 is connected through a resistor 33a to the base electrode of a transistor 35, the collector electrode of which is connected to a positive voltage supply through a resistor 34a and is also connected to the cathode of a diode 38, and its emitter electrode is connected to the negative voltage supply. The junction of the resistors 29 and 30 is connected through a resistor 33b to the base electrode of a transistor 36, the collector electrode of which is connected to the positive voltage supply through a resistor 34b and is also connected to the cathode of a diode 39 and its emitter electrode is connected to the negative voltage supply. The junction of the resistors 31 and 32 is connected through a resistor 33c to the base electrode of a transistor 37, the collector electrode of which is connected to the positive voltage supply through a resistor 34c and is also connected to the cathode of a diode 40 and its emitter electrode is connected to the negative voltage supply.

The anodes of the diodes 38, 39 and 40, forming an AND circuit, are connected to the positive voltage supply through a resistor 41 and are also connected to a terminal 42.

In operation of the phase unbalance or open-phase detecting apparatus according to this invention, currents which are in proportion to currents from the three phase signal circuit are derived from the secondary windings 1 thorugh 3 of the current transformers and converted into voltage signals by the resistors 4, 5 and 6. The alternating voltage signals developed by the resistors 4, 5 and 6 are rectified into half wave signals by the diodes 7, 8 and 9, respectively. The rectified half wave voltage signals are smoothed by the resistor 22 and the capacitor 23, resulting in a positive direct voltage signal in common to the phase signals.

On the other hand, the alternating voltage signals are also rectified into negative full wave signals by diodes 10 and 11, 12 and 13, and 14 and 15, respectively. The first of these negatively rectified full wave signals is smoothed by the resistor 16 and the capacitor 17, resulting in a negative direct voltage signal for the R phase signal. The second of these negatively rectified full wave signals is smoothed by the resistor 18 and the capacitor 19, resulting in a negative direct voltage signal for the S phase signal, and the third signal thereof is smoothed by the resistor 20 and the capacitor 21, resulting in a negative direct voltage signal for the T phase signal.

The negative direct voltage signal from the resistor 16 and the capacitor 17 is compared with the positive direct voltage signal by the diode 24, and the resistors 27 and 28, whereby a difference signal is derived between the junction of the resistors 27 and 28, and the common negative supply line. The negative direct voltage signal from the resistor 18 and the capacitor 19 is compared to the positive direct voltage signal by diode 25, and the resistors 29 and 30, whereby a difference signal is derived between the junction of the resistors 29 and 30, and the common negative supply line. The negative direct voltage signal from the resistor 20 and the capacitor 21 is compared to the positive direct voltage signal by the diode 26, and the resistors 31 and 32, whereby a difference signal is derived between the junction of the resistors 31 and 32 and the common negative supply line.

Here, it is assumed that a voltage across the capacitor 23 is expressed as $V_1$, a voltage across the capacitor 17 is expressed as $V_2$, and a difference voltage thereof, that is, the voltage between the common negative voltage supply line and the junction of the resistors 27 and 28 is expressed as $V_3$. In a normal condition in which a constant current flows through each of the phase signal lines, the parameters of the circuit shown in FIG. 1 are determined such that the voltage $V_3$ becomes negative with respect to the common negative voltage supply as shown in FIG. 2. Therefore, the transistors 35 through 37 are normally biassed off, whereby no output signal is developed between the output terminal 42 of AND circuit and the positive voltage supply line.

Now, when the current of the R phase signal line is lowered by a predetermined amount below those of the S and T phase signal lines, the ripple components contained in the rectified phase signals are more and less changed. However, if they are smoothed, the smoothed phase signals will remain unchanged in voltage.

On the other hand, the negative direct voltage signal of the R phase signal is lowered because of the lowering of the current of the R phase signal line, resulting in an unbalancing of the R phase signal. Then, the voltage $V_2$ will be lowered to a predetermined value. When the voltage $V_2$ is lowered, the voltage $V_3$ is changed from a negative level to a positive level as shown in FIG. 2. The rise in the voltage level causes the transistor 35 to be turned on, whereby a predetermined signal level is obtained between the output terminal 42 and the positive voltage supply line. If the current in the R phase signal line is zero amperes or the current thereof is lacking, the voltage $V_3$ becomes more positive, resulting in a larger voltage signal level between the output terminal 42 and the common positive voltage supply line.

It is apparent from the above description that the operations of the S and T phase signals is similar to that of the R phase signal.

In the detection apparatus shown in FIG. 1, since the voltage $V_1$ is determined by the current of one of the three phase signals, the phase unbalancing or open-phase of the other two phase signals can be detected even if the currents in the other two phase signals are all lowered. Further, when all of the currents in the three phase signals are zero or they are all lacking, the voltages $V_1$ through $V_3$ are all zero. Therefore, the transistor 35 through 37 are turned off, whereby no output signal is developed between the output terminal 42 and the common positive voltage supply line.

Now, explanation will be made with respect to another embodiment of the detection apparatus shown in FIG. 3. The detection apparatus shown in FIG. 3 is similar to that shown in FIG. 2 with the exception that it has a common switching circuit or a Schmitt trigger circuit comprising two transistors $T_{r1}$ and $T_{r2}$ for the phase signals. In FIG. 3, the same components are designated by the to same reference numbers as FIG. 2. The junctions of the resistors 27 and 28, 29 and 30, and 31 and 32, which are connected to the common negative voltage supply through resistors 49, 50 and 51 respectively, are connected to the anodes of diodes $D_1$, $D_2$ and $D_3$, respectively, the cathodes of which are connected to a resistor 43 in common. The resistor 43 is connected to a varistor $R_v$ and is also connected to the base electrode of a transistor $T_{r1}$, the emitter electrode of which is connected to the negative voltage supply through a resistor 46 and is also connected to the emitter electrode of a transistor $T_{r2}$ and its emitter electrode is connected to the positive voltage supply through a resistor 44 and also to one end of a resistor 45, the other end of which is connected to the base electrode of the transistor $T_{r2}$ whose collector is connected to a positive voltage supply through a resistor 48 and is also connected to the terminal 42.

The difference signals developed between the junctions of the resistor 27, 28, 29, 30 and 31, 32 and the common negative voltage supply line already mentioned in FIG. 2 are fed to the varistor $R_v$ and the Schmitt trigger circuit through an OR circuit comprising diodes $D_1$, $D_2$ and $D_3$, and resistor 43. In a normal condition, since the voltage $V_3$ is negative or zero, the transistor $T_{r1}$ is biassed off. The burning off of the transistor $T_{r1}$ causes the transistor $T_{r2}$ to be biassed on, whereby a nearly zero voltage level signal is developed between the common negative voltage supply line and the output terminal 42. However, when any one of the phase signals is unbalanced or open-phased, the transistor $T_{r1}$ is turned on. The turning on of the transistor $T_{r1}$ causes the transistor $T_{r2}$ to be turned off, whereby a nearly voltage supply level signal is developed between the common negative voltage supply line and the output terminal 42.

Therefore, the phase unbalancing or open-phase of the phase signal can be detected.

The detection apparatus according to this invention has been described with respect to three-phase signals. However, it is of course understood that the detection apparatus according to this invention is also applicable to a single phase signal circuit (which is grounded to one winding of a Scott connection transformer or the like) and a pole phase signal circuit.

The detection apparatus shown in FIG. 1 has following advantages.

a. since detection of the phase unbalancing or open-phase of any one of the phase signals is performed by using the difference voltage signals of the direct voltage signals of the phase signals in a normal condition and the direct voltage signals to which the lowered currents are converted because of the phase unbalancing or open-phase of any one of the phase signals, this detection apparatus is entirely free from erroneous operation caused by a transformer exciting surge current, direct components at the time of starting motors, changes in the waves or phases caused by non-loading exciting currents and the like. Further, the negative direct voltage signals are full-wave rectified by using center taps provided in the current transformers. Therefore, even if the waves of the phase signals are biased towards either one the positive or negative side, the negative direct voltage signals may be surely obtained therefrom, whereby the phase unbalancing or open-phase of any one of the phase signals can be accurately detected.

b. The magnitude of the difference signals, that is, the unbalancing rate can be changed by suitably regulating the resistance values of the resistors 27, 28, 29, 30, 31 and 32.

c. The construction of the detection apparatus is simple as compared to prior art detection apparatus and is, therefore, low in cost.

d. Since a plurality of switching means, which are the same in number as the polyphase signals, are provided, the open-phase of the phase signals can be detected, and, further, breaking and failure of transmission lines are also detected.

This invention is not limited to the above described embodiments but various variations and modifications may be made departing from the scope and spirit of the invention.

What Is Claimed Is:

1. Apparatus for detecting a phase-current imbalance or open-phase condition in a polyphase circuit, which comprises:

a plurality of current transformers, each having a primary winding connected in one of the phases of said polyphase circuit and a center-tapped secondary winding;

first rectifying means, connected to one terminal of each of said plurality of secondary windings, for developing a smoothed d.c. signal of a first polarity between the rectifying means and said center-tap;

a plurality of second rectifying means, each connected to the other terminal of a corresponding secondary winding, for developing at least one smoothed d.c. signal voltage between at least one of the second rectifying means and said center-tap, said signal voltage being proportional to the alternating current in a corresponding phase and opposite in polarity to the signal of said first polarity;

means, connected to said first rectifying means and to each of said plurality of second rectifying means, for developing at least one difference signal corresponding to the voltage difference between said d.c. signal of a first polarity and said at least one d.c. signal of a second polarity; and detecting means, responsive to said difference signal, for detecting an imbalance in the current value or an open-phase condition in any one of said polyphase lines.

2. Apparatus according to claim 1, wherein said first rectifying means comprises a plurality of similarly-poled half-wave rectifiers, each having one electrode connected to one terminal of a corresponding secondary winding and the other electrode connected to a common smoothing circuit; and said second rectifying means comprises a plurality of center-tapped full-wave rectifiers corresponding to the respective phases and each connected to the terminals of a corresponding secondary winding and to an associated smoothing circuit.

3. Apparatus according to claim 1, wherein the center-tap of each secondary winding is connected in common to a source of reference potential of said detecting means and said d.c. signals of said first and second polarity are measured with respect to said reference potential.

4. Apparatus according to claim 2, wherein said half-wave rectifiers comprise semiconductor diodes, and said common smoothing circuit comprises a resistor and a capacitor; and said full-wave rectifiers each comprise a pair of similarly-poled semiconductor diodes and said associated smoothing circuits each comprise a resistor and a capacitor.

5. Apparatus according to claim 1, wherein said detecting means comprises:
a plurality of normally non-conducting transistors each receiving on the base circuit thereof a corresponding one of said plurality of difference signals; and
an AND-gate having a plurality of inputs, each connected to the collector of a corresponding transistor.

6. Appparatus according to claim 1, wherein said detecting means comprises:
an OR-gate having a plurality of inputs each receiving a corresponding one of said difference signals; and
a Schmitt trigger circuit having its input connected to the output of said OR-gate.

* * * * *